United States Patent [19]

Heetfield

[11] Patent Number: 4,814,024

[45] Date of Patent: Mar. 21, 1989

[54] NICKEL BASE ALLOY GLASS SHAPING MEMBER

[75] Inventor: Robert D. Heetfield, Sylvania, Ohio

[73] Assignee: Owens-Illinois Glass Container Inc., Toledo, Ohio

[21] Appl. No.: 31,967

[22] Filed: Mar. 30, 1987

[51] Int. Cl.$^4$ ................................................. C22F 1/10
[52] U.S. Cl. ..................................... 148/2; 65/374.12; 148/3; 148/11.5 N; 148/12.7 N; 148/13; 148/162; 148/410; 148/427; 164/519
[58] Field of Search ............................. 420/441, 442; 65/374.12; 148/2, 3, 11.5 N, 12.7 N, 13, 162, 410, 427; 164/519

[56] References Cited

U.S. PATENT DOCUMENTS 2,936,229   5/1960   Shepard ............................. 420/441

Primary Examiner—R. Dean

[57] ABSTRACT

An alloy having the following composition limits by weight:

Chromium 13–15%, silicon 3.4–4.2%, boron 1.7–2.3% and the balance nickel, is cast in a mold that is made by the lost wax process from $CaCO_3$, so that when the molten metal alloy is cast in the preheated mold at 2300° F., held in a furnace at 1750° F. for an hour, and then rapidly cooled to room temperature. The casting will have a fairly low hardness of $R_c30\pm3$ so that it can be machined. After machining, the casting is heated to a temperature of 1150° F. for at least three hours before cooling, resulting in a casting that is hardened to $R_c45$ to $R_c50$.

6 Claims, No Drawings

NICKEL BASE ALLOY GLASS SHAPING MEMBER

This invention relates to a nickel base alloy for use as a molten glass shaping tool, which alloy is subject to a first heat treatment to render it more easily machined and then to a second heat treatment for increasing the hardness.

This invention further relates to a process of forming a ceramic casting mold for the nickel base alloy, which mold is strong enough to retain its shape until the molten alloy has solidified, but will separate from the casting at the rapid cool-down to room temperature.

It has been the practice in the past to form glass molding parts, such as baffle inserts, funnels, bottom plates, lehr transfer plates, dead plates, and blank molds, from "Dameron HR-40", a material that is sold by Dameron Alloy Foundries, 927 South Santa Fed Avenue, Compton, Calif. one problem with this material has been that it is not as resistant to corrosion as one would desire.

Glass shaping tools are generally constructed of iron, steel or steel alloy and their glass contacting surfaces are highly polished to the necessary finish to give the formed glass article a smooth surface finish and allow release of the glass from the tool after it shaped and sufficiently cooled. The shaping tool also serves as a means to conduct heat away from the glass as it is shaped. Ferrous metals have a tendency towards surface oxidation which sets up a layer of rust and corrosion on the surface of the tool. This oxidation changes the thermal conductivity of the tool. The oxidized surfaces have a tendency to act as a heat insulating barrier and also tend to accelerate wear. Once the wear has progressed to a certain degree, it is necessary to replace the tool or to restore it to the operating tolerances of the article being formed.

It is important that the forming of the tool be made as quickly and easily as possible and that the glass contacting surface of the tool have a sufficient hardness to withstand wear and abrasion encountered in the normal use of the tool. It is well known that molten glass is quite abrasive.

In the casting of metal alloy tools for the glass industry, it has been common practice to use ceramic molds made by the "lost wax" process of forming the wax impression and then coating the wax impression until a desired wall thickness is achieved, then curing the mold after the wax is melted and removed from the mold.

Applicant has developed a new mold utilizing calcium carbonate particles as a major ingredient of the mold and where the mold is cured by slowly heating to a temperature of 1000° F. In making the mold, a plurality of coatings of a fine size calcium carbonate and a refractory slurry are used to build up the wall thickness desired and then dried at 150° F. Once dried, it was wrapped about its entire circumference with cotton twine to prevent the mold from cracking when the wax impression was melted out. By placing in a furnace, the temperature of the mold was raised to 200° F. in order to melt out the wax impression. The mold may be removed from the furnace and inverted to pour out the molten wax.

The mold is returned to the furnace and the temperature of the furnace is slowly raised to 1600° F. This heating of the mold accomplishes five things:

1. All moisture is removed as the temperature goes above 212° F.;
2. The cotton twine burns off as the temperature goes above 475° F.;
3. Any residual wax is burned off as the temperature goes above 500° F.;
4. The mold is cured or hardened as the temperature goes above 1000° F. This, in effect, completes the process for forming the mold. If the mold is to be used immediately,
5. The mold is already preheated to reduce the thermal shock when the molten metal alloy is poured into the mold.

When the mold is filled with the molten metal, it is immediately put into a furnace that is heated to 1750° F. By having the filled mold placed immediately into the heated furnace, two things are accomplished:

1. The molten metal solidifies and comes to thermal equilibrium above the temperature at which a hard phase begins to form in the alloy of the invention. If the hard phase were permitted to form during a slow cooling to room temperature, the alloy would be so hard that it would be very difficult to machine.
2. When the temperature of the calcium carbonate ($CaCO_3$) particles in the mold reach 1650° F. they will decompose into calcium oxide and carbon dioxide gas which results in a volume increase. This increase or expansion causes cracks to occur in the mold which increases the desirable result of the mold breaking up and separating from the casting.

As set forth below, the process of forming glass mold parts begins with the melting of a new chromium-nickel alloy having the composition limits by weight of:

| Metal | Percent |
| --- | --- |
| Chromium | 13-15 |
| Silicon | 3.4-4.2 |
| Boron | 1.7-2.3 |
| Nickel | Balance |

More specifically, the preferred alloy composition by weight percent is as follows:

| Metal | Percent |
| --- | --- |
| Chromium | 14 |
| Silicon | 3.8 |
| Boron | 2.2 |
| Nickel | Balance |

This molten alloy is poured into a mold from a temperature of about 2300° F. The mold is immediately put into a furnace at a temperature of 1750°±50° F. When the alloy has cooled to the temperature of the furnace, it is kept at this 1750°±50° F. for at least one hour. The casting is then removed and rapidly cooled down to room temperature, usually by quenching in a liquid.

When the mold is made with calcium carbonate, as set forth above, the immediate quenching of the casting may be in water, which all effectively remove any of the mold that may have not broken away from the casting. The immediate and rapid cooling of the casting will result in the alloy having a hardness of $R_c 30 \pm 3$. In order to achieve this rapid cooling of the casting, the mold must be removed before the start of the cool down process, because otherwise the ceramic mold would act as an insulator. As set forth above, when the mold contains $CaCO_3$ and is subjected to the heat of the molten alloy and the molding furnace temperature of 1750°±50° F., the CaCO₃ will be decomposed into CaO and CO₂ gas. Any mold material that may be left on the casting at the time it is quenched in water will be transformed into calcium hydroxide with the release of heat, which will also react with the water to produce steam which rapidly expands and causes the mold to disintegrate into very small particles.

After rapid cooling to room temperature, the alloy casting will have a Rockwell "C" hardness of R$_c$30±3 and it can be machined into the mold part or glass contacting member with relative ease using high speed steel or tungsten carbide tool bits.

When a plurality of parts formed from the alloy set forth above were investment cast in the usual manner, they had a Rockwell "C" hardness that varied from R$_c$39 to R$_c$45 with an average of R$_c$41. These would be difficult to machine because of their hardness.

In the use of the process of the invention, the investment cast alloy pieces can be held at temperature of 1750°±50° F. for at least an hour and then rapidly cooled, as set forth above, to effectively reduce their hardness to R$_c$30 ±3 so that they may be machined.

Once the machining has been carried out, on the castings of the nickel-chromium-silicon-boron alloy set forth above, they are placed in an oven and subjected to a second heat treatment. The second heat treatment comprises holding at a temperature of 1150°±50° F. for at least three hours and then shut off the heat and let the castings cool to room temperature in the furnace. The resultant alloy members so treated showed an increase in hardness to R$_c$45 to R$_c$48.5 and two guide rings that had been work hardened, after machining, to R$_c$46.5 and R$_c$50.5 were given the second heat treatment which increased their hardness to R$_c$52.5 and R$_c$53 without any change in dimensions.

A number of baffle inserts made from the alloy set forth above were test operated on a glass forming machine making Narrow Neck Press and Blow process bottles. The test was run for more than 40 days and it was found that these inserts lasted four to five times longer in service than the standard Dameron HR-40 baffle inserts that were used at the same time on this same machine for the same job. It is believed that the foregoing description sets forth the best mode contemplated by Applicant for carrying out the present invention in the new chromium, silicon, boron, nickel alloy, the process for forming and treating the cast alloy parts and the novel mold used for casting the alloy.

While the preferred method of casting the alloy of the invention is set forth above, an alternative method is as follows:

When the mold is filled with the molten alloy, it is allowed to cool down to room temperature or it can be immediately put into a furnace that is heated to 1750° F., allowed to come to thermal equilibrium at the 1750° F. and then removed from the furnace and permitted to cool down to room temperature. The mold is then removed from the casting. The casting is then placed in a furnace which is heated to 1750° F. and held therein for a time which is sufficient to dissolve the hard phase, and then the casting is removed from the furnace and rapidly cooled down to room temperature, usually by quenching in a liquid.

What is claimed is:

1. A glass shaping member for shaping molten glass, comprising a wall structure for contacting molten glass and formed of a metal alloy consisting essentially of: 13–15 wt/% Cr; 3.4–4.2 wt/% Si; 1.7–2.3 wt/% B, where wt% denotes weight percent, with the balance being nickel, and the member is first cast, then heat treated to reduce its hardness for machining and then heat treated after machining to increase its hardness.

2. The method of forming a molten glass shaping member from a substantially nickel alloy consisting essentially of: 13–15 wt/% Cr.; 3.4–4.2 wt/%. Si; 1.7–2.3 wt/% B, where wt/% denotes weight percent, with the balance being nickel, comprising the steps of melting the alloy, pouring the alloy into a mold, immediately putting the mold into a furnace at 1700°–1800° F. for at least one hour, removing the casting from the furnace and rapidly cooling to room temperature, machining the casting to the desired shape, heating the machined casting to a temperature of 110°–1200° F. for at least three hours and then gradually cooling the alloy to room temperature.

3. The method of forming a ceramic mold from a wax impression for a cast metal alloy, comprising the steps of:
   a. dipping the wax impression into a refractory material slurry;
   b. coating the slurry layer with small particles of refractory material and drying at 150° F. in a hot air furnace;
   c. repeating step b. several times to produce several layers consisting of slurry material and particles of refractory material on the wax impression;
   d. substituting small particles of calcium carbonate for the small particles of refractory material and repeating steps b. and c. until a mold of the desired wall thickness is obtained;
   e. wrapping the total circumference of the mold with a cotton twine;
   f. heating the mold to a temperature sufficient to melt the wax;
   g. pouring the molten wax from the mold; and
   h. slowly increasing the temperature of the heating furnace to 1000° F. to remove any moisture, burn off the cotton twine and residual wax, and cure the mold.

4. The method of forming metal alloy glass shaping mold members, comprising the steps of preheating a ceramic mold to a temperature of 1600° F., casting a nickel base alloy into the ceramic mold, said nickel base alloy consisting essentially of: 13–15 wt/% Cr.; 3.4–4.2 wt/% Si.; 1.7–2.3 wt/% B, where wt/% denotes weight percent, with the balance nickel, placing the filled mold in a furnace at 1750° F. for a time sufficient to bring the metal alloy to thermal equilibrium at 1750° F., when its hard phase begins to form, and allowing the mold to reach a temperature in excess of 1650° F., then rapidly quenching the formed alloy mold member in water to cool it to room temperature and remove any residue of the mold therefrom.

5. A glass shaping member for use in glassware forming machines constructed to define at least a portion of the glass contacting surface of a molded glass article, for shaping molten glass thereby comprising a wall structure formed of a substantially nickel alloy consisting essentially of: 13–15 wt/% Cr.; 3.4–4.2 wt/% Si; 1.7–2.3 wt/% B, where wt/% denotes weight percent, with the balance being nickel.

6. A glass shaping member constructed to define at least a portion of the glass contacting surface of a molded glass article, for shaping molten glass thereby comprising a wall structure formed of a substantially nickel alloy consisting essentially of: 14 wt/% Cr; 3.8 wt/% Si; 2.2 wt/% B, where wt/% denotes weight percent, with the balance being nickel.

* * * * *